Nov. 6, 1951  J. OLSON  2,574,281
PUSH OR PULL TOGGLE CLAMP
Filed April 23, 1945
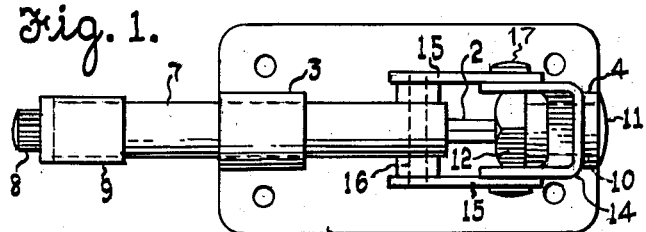
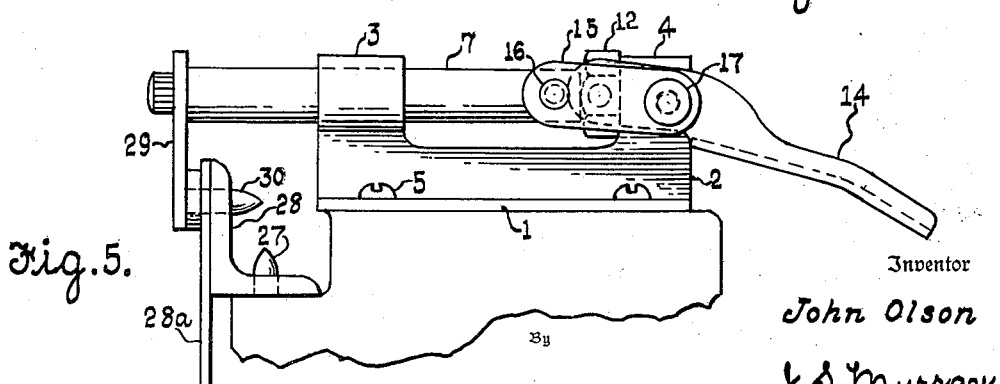
Inventor
John Olson
J. S. Murray
Attorney Patented Nov. 6, 1951

2,574,281

UNITED STATES PATENT OFFICE 2,574,281

PUSH OR PULL TOGGLE CLAMP

John Olson, Detroit, Mich.

Application April 23, 1945, Serial No. 589,804

7 Claims. (Cl. 74—1)

This invention relates to toggle clamps and particularly toggle clamps of a plunger type.

An object of the invention is to adapt a toggle-operated clamping plunger to respond to either a pushing or pulling force in exercising its function.

Another object is to adapt a toggle-operated clamping plunger to be rocked about its longitudinal axis in unison with its actuating mechanism to accommodate the appliance to various jobs and afford more convenient actuation.

These and various other objects are attained by the construction hereinafter described and illustrated in the accompanying drawing, wherein:

Fig. 1 is a top plan view of the clamp in released position.

Fig. 2 is a side elevational view of the same.

Fig. 3 is a front end view of the same.

Fig. 4 is a side elevational view of the clamp exercising a pushing force.

Fig. 5 is a side elevational view showing the clamp exercising a pulling force.

In these views, the reference character 1 designates a mounting fashioned from a substantially rectangular sheet metal plate having a central rectangular aperture 1a, the apertured portion of the plate being folded upon itself in an upstanding relation to opposed margins of the plate as indicated at 2, the portions separated by the aperture being tubularly expanded to form aligned front and rear bearings 3 and 4. Said opposed margins form the base of the clamp and are pierced to receive screws 5 attaching the appliance to any suitable fixed support 6.

Slidable and rockable in the front bearing 3 is a clamping plunger 7, having in its front end a tapped opening receiving a headed screw 8 attaching any desired pressure-applying adapter such as the angular member 9 shown in Figs. 1 and 2. Rockable in the rear bearing 4 is a fulcrum member formed by a stub shaft 10, having its rear end upset as indicated at 11 against the rear end of such bearing and formed with a hexagonal head 12 engaging the front end of the bearing. Thus the stub shaft is restrained from any longitudinal movement.

Extended diametrically through the head 12 is a pin 13, fulcruming a lever 14 having a bifurcated supporting end portion, the furcations of which straddle said head. Said lever is adapted to swing through an arc of substantially one hundred and eighty degrees to assume limiting positions substantially parallel to the common axis of the plunger and stub shaft, in which positions it projects respectively forwardly and rearwardly from the head 12. A pair of links 15 have forward ends straddling the rear end of the plunger 7 and pivoted on a pin 16 carried by and transverse to the plunger, the other ends of said links being pivoted to the lever at opposite sides thereof by a pair of spaced aligned rivets 17. Thus a toggle is formed, adapting the lever in any position to actuate the plunger with a considerable mechanical advantage, such advantage being greatly multiplied as the lever approaches either of its limiting positions. The spacing of the bearings 3 and 4 is preferably substantially the minimum required to avoid restriction of the plunger in its lever-induced travel. The bifurcated length of the lever suffices to permit straddling of the bearing 4 as the lever is swung to its rear limiting position, such position being established by engagement of the transverse edge 18 of the lever with the upright rear edge of the frame (see Fig. 5). The forward limiting position of the lever is established by its engagement with the bearing 3, as per Fig. 4. In both limiting positions the axis of the rivets 17 is shifted slightly past the plane established by the pins 13 and 16, this achieving a locking effect by opposing the full applied clamping stress to release of the lever.

Fig. 4 illustrates use of the clamp in adding a plate 19 to an assembly comprising an angle bar 20 and plate 21. In adapting the clamp to this use the support 6 has an extension 22 seating the work and carrying pins 23 resisting movement of the work under clamping stress. As the lever thrusts the plunger 7 forwardly a pointed forward portion of an adapter pin 24 enters and accurately aligns openings 25 in the parts 19 and 20. This may serve to also establish registration of any desired number of additional openings in said parts. As the lever approaches its limiting position, a collar 26 fixed on the pin 24 thrusts the plate 19 firmly against the bar 20. The proper assembly relation of the parts being thus established, any necessary assembly operations may be performed, as drilling additional holes or inserting fasteners.

In Fig. 5, showing exercise of a pulling clamping force, one or more pins 27 upstanding on the support 6 hold an angle bar 28 in place while a plate 28a is clamped against said bar by an adapter 29 rigidly downwardly projecting from the plunger, said adapter carrying a pointed pin 30 entering and accurately aligning openings in said bar and plate.

The adaptability of the appliance is greatly increased by enabling it to apply either a pushing or pulling force. It will be noted that the lever 14 is of the second class as used in my appliance, its force being applied at a point between its fulcrum and handle end.

In applying the described clamp, the shape and size of the pieces to be clamped will in some instances tend to interfere with operation of the lever 14. By adapting the latter to rock through a considerable angle about the plunger axis, the appliance may be suited to many jobs that otherwise would not permit manipulation of the lever. Also maintenance of a laterally rocked position of the lever will often render the latter more readily accessible. In Fig. 4, a headed screw 31 set into the stub shaft 10 is adapted to be clamped against the bearing 4 to maintain any desired rocked position of the lever.

What I claim is:

1. In a toggle clamp, a mounting, a clamping member reciprocable in the mounting, a lever, means fulcruming the lever on the mounting adapting the lever to swing through substantially one hundred and eighty degrees, a link forming a swinging actuating connection from the lever to the clamping member, said link and the lever portion between the link and lever fulcrum forming a toggle and substantially aligning in positions of the lever substantially one hundred and eighty degrees apart, said mounting forming stops respectively engaged by the lever in its respective specified positions.

2. In a toggle clamp, a mounting formed with spaced front and rear bearings substantially aligned, a clamping member reciprocable and rockable in the front bearing, a fulcrum member rockable in the rear bearing, a lever fulcrumed on the fulcrum member transversely to its rocking axis, and a link establishing an actuating connection from the lever to the clamping member and forming a toggle pair with the lever portion between the link and fulcrum, and compelling the clamping member to rock in unison with the lever and fulcrum member.

3. A toggle clamp as set forth in claim 2, the fulcrum member having a head between said bearings and the lever having furcations straddling and fulcrumed on said head.

4. A toggle clamp as set forth in claim 2, said lever having a forwardly projecting clamping position of engagement with the front bearing, and having a rearwardly projecting clamping position in which said furcations straddle the rear bearing.

5. In a toggle clamp, the combination with an elongated reciprocable clamping member, a work-engaging adapter on an end of said member, a lever for reciprocating such member, and a toggle actuating connection from the lever to the other end of said member, of a mounting for said clamping member, lever and connection, affording rocking thereof in unison about an axis extending in the direction of reciprocation of said member, to accommodate the clamp to various forms of clamped work.

6. In a toggle clamp, an elongated reciprocable clamping member, a work-engaging adapter on an end of said member, a lever rockable about an axis transverse to the direction of reciprocation for effecting reciprocation of said member, a toggle actuating connection from the lever to the other end of said member, and a mounting for the lever affording rocking thereof about an axis extended in the direction of said reciprocation, to accommodate the clamp to various forms of clamped work.

7. In a toggle clamp, an elongated reciprocable clamping member rotative about its axis of rotation, a slide bearing for said clamping member, a lever for reciprocating the clamping member, a fulcrum member for the lever substantially axially aligned with the clamping member, a journal bearing for the fulcrum member affording such member rotation substantially about said axis, means operatively mounting the lever on its fulcrum member, an actuating connection to the clamping member from the lever adapted to lock such member at either limit of its reciprocation, said connection forming a means to establish unison of rotation between the fulcrum and clamping members about said axis, and a mounting carrying said bearings in a fixed spaced relation.

JOHN OLSON.

REFERENCES CITED

The following references are of record in the file of this patent:

UNITED STATES PATENTS

| Number | Name | Date |
|---|---|---|
| 62,510 | Tracy | Feb. 26, 1867 |
| 154,548 | Hamilton | Sept. 1, 1874 |
| 337,924 | Chase | Mar. 16, 1886 |
| 462,490 | Kerwin | Nov. 3, 1891 |
| 588,439 | Johnson | Aug. 17, 1897 |
| 627,084 | Wyman | June 13, 1899 |
| 879,005 | Rockstroh | Feb. 11, 1908 |
| 1,046,241 | Watrous | Dec. 3, 1912 |
| 1,380,867 | DeBolotoff | June 7, 1921 |
| 1,540,247 | Bowman | June 2, 1925 |
| 1,857,220 | Thurnin | May 10, 1932 |
| 2,223,644 | Smith | Dec. 3, 1940 |
| 2,381,588 | Hall | Aug. 7, 1945 |
| 2,412,736 | James | Dec. 17, 1946 |